US 6,746,779 B2

(12) United States Patent
Hayes et al.

(10) Patent No.: US 6,746,779 B2
(45) Date of Patent: Jun. 8, 2004

(54) SULFONATED ALIPHATIC-AROMATIC COPOLYESTERS

(75) Inventors: Richard Allen Hayes, Brentwood, TN (US); Leonard Edward Kosinski, Chadds Ford, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/927,731

(22) Filed: Aug. 10, 2001

(65) Prior Publication Data

US 2003/0036626 A1 Feb. 20, 2003

(51) Int. Cl.[7] .......................... B32B 27/06; C08G 63/02
(52) U.S. Cl. .................... 428/480; 528/295; 528/296; 528/298; 528/300; 528/302; 528/307; 528/308; 528/308.6; 524/81; 524/82; 524/113; 524/233
(58) Field of Search ........................ 528/295, 296, 528/298, 300, 302, 307, 308, 308.6; 428/480; 524/81, 82, 113, 233

(56) References Cited

U.S. PATENT DOCUMENTS

| | | |
|---|---|---|
| 4,104,262 A | 8/1978 | Schade |
| 4,340,519 A | 7/1982 | Kotera et al. |
| 4,394,442 A | 7/1983 | Miller |
| 4,598,142 A | 7/1986 | Hilbert et al. |
| 4,934,442 A | 6/1990 | Futamura et al. |
| 5,171,309 A | 12/1992 | Gallagher et al. |
| 5,510,417 A | 4/1996 | Tachika |
| 5,563,236 A | 10/1996 | Murata et al. |
| 6,114,042 A | 9/2000 | Warzelhan et al. |

FOREIGN PATENT DOCUMENTS

| | | |
|---|---|---|
| EP | 0 376 693 | 7/1990 |
| EP | 0 548 728 A1 | 12/1992 |
| EP | 0 709 419 A2 | 5/1996 |
| JP | 58 210960 A | 12/1983 |
| JP | 59 084967 A | 5/1984 |
| JP | 05 331410 A | 12/1993 |
| JP | 2001 205766 A | 7/2001 |
| JP | 2001 205768 A | 7/2001 |

*Primary Examiner*—Samuel A. Acquah

(57) ABSTRACT

A copolyester having an inherent viscosity of equal to or greater than about 0.3 formed from about 20 to about 60 mole percent based on the amount of aromatic dicarboxylic acid of one or more of isophthalic dicarboxylic acid or an alkyl diester thereof, about 40 to about 80 mole percent based on the amount of aromatic dicarboxylic acid of one or more of terephthalic acid or 2,6-naphthalene dicarboxylic acid or an alkyl diester thereof, about 10 to about 60 mole based on the total amount of dicarboxylic acids of one or more aliphatic dicarboxylic acids or an alkyl diester, about 0.1 to about 5 mole percent based on the moles of total dicarboxylic acid of one or more alkali or alkaline earth metal salts of 5-sulfoisophthalic dicarboxylic acid or an alkyl diester thereof, about 90 to 100 mole percent based on the total amount of glycols of one or more aliphatic glycols, and 0 to about 10 mole percent based on the total amount of glycols of one or more of di(ethylene glycol) and tri (ethylene glycol). The copolyesters are useful to form films and coatings.

11 Claims, No Drawings

SULFONATED ALIPHATIC-AROMATIC COPOLYESTERS

BACKGROUND OF THE INVENTION

1. Field of the Invention

This invention relates to solvent soluble, biodegradable polyesters, method of production, and use thereof. These products are useful as biodegradable shaped articles and as biodegradable coatings.

2. Description of the Related Art

The inadequate treatment of municipal solid waste which is being put in landfills and the increasing addition of nondegradable materials, including plastics, to municipal solid waste streams are combining to drastically reduce the number of landfills available and to increase the costs of municipal solid waste disposal. While recycling of reusable components of the waste stream is desirable in many instances, the costs of recycling and the infrastructure required to recycle materials is sometimes prohibitive. In addition, there are some products which do not easily fit into the framework of recycling. The composting of non-recyclable solid waste is a recognized and growing method to reduce solid waste volume for landfilling and/or making a useful product from the waste to improve the fertility of fields and gardens. One of the limitations to marketing such compost is the visible contamination by undegraded plastic, such as film or fiber fragments.

It is desired to provide components which are useful in disposable products and which are degraded into less contaminating forms under the conditions typically existing in waste composting processes.

Polyesters have been considered for biodegradable articles and enduses in the past. Biodegradable polyesters can be described as belonging to three general classes; aliphatic polyesters, aliphatic-aromatic polyesters, and sulfonated aliphatic-aromatic polyesters. Aliphatic polyesters are polyesters derived solely from aliphatic dicarboxylic acids. Aliphatic-aromatic polyesters are polyesters derived from a mixture of aliphatic dicarboxylic acids and aromatic dicarboxylic acids. Sulfonated aliphatic-aromatic polyesters are polyesters derived from a mixture of aliphatic dicarboxylic acids and aromatic dicarboxylic acids and, in addition, incorporate a sulfonated monomer, such as the salts of 5-sulfoisophthalic acid. Many of these prior materials do not provide desired biodegradability and/or solubility in common solvents.

U.S. Pat. No. 4,104,262, teaches water-dispersible polyester resins. The water-dispersibility of the polyester resins is due, at least in part, to the incorporation of moieties of an alkali metal-sulfo group and to the very low molecular weights of the polymers, e.g., between 300 and 3,000. The low molecular weight polyester resins would tend to give brittle, low toughness films and coatings.

U.S. Pat. No. 4,340,519, teach aqueous dispersions of polyester resins which contain 0.5 to 10 mole percent of an aromatic dicarboxylic acid having a metal sulfonate group. Many of the polyesters of this patent incorporate neopentyl glycol. Example A-1, contained within Table 2 of the patent, incorporates 16.7 mole percent of isophthalic acid within the aromatic dicarboxylic acid component. This example was found to be crystalline, based on the reported melting point of 116° C., and is not expected to be soluble in polar solvent. Such solubility is often desired, e.g., to allow solvent casting of coatings and films.

Miller, in U.S. Pat. No. 4,394,442, teaches a subbing layer composed of an aqueous dispersion of certain copolyester resins which incorporate 0.1 to 10 mole percent aromatic sulfonated compounds. The patent exemplifies copolyester resins which incorporate 10 mole percent, (based on the total of dicarboxylic acids), of the sodium salt of 5-sulfoisophthalic acid in combination with 56.7 mole percent, (based on the total of diols), di(ethylene glycol). Such polyesters that are soluble in water are often undesired because they do not have the desired dimensional stability in the presence of water.

The above-mentioned polyesters of the art often suffer from poor solubility in polar solvent systems, low molecular weights, which could lead to brittle films, or high moisture sensitivity, which could lead to dimensional instability under varying moisture conditions. The present invention overcomes these shortcoming and provides solvent soluble, film forming copolyesters which have improved moisture insensitivity.

SUMMARY OF THE INVENTION

The present invention provides a copolyester having an inherent viscosity of equal to or greater than about 0.3 dL/g comprising:

(a) about 20 to about 60 mole percent based on the moles of aromatic dicarboxylic acid or ester, of one or more of isophthalic dicarboxylic acid or an alkyl diester thereof, (b) about 40 to about 80 mole percent based on the moles of aromatic dicarboxylic acid or ester, of one or more of terephthalic acid, an alkyl diester thereof, 2,6-naphthalene dicarboxylic acid, or an alkyl diester thereof, (c) about 10 to about 60 mole percent based on the moles of dicarboxylic acid or ester, of one or more aliphatic dicarboxylic acids or an alkyl diester thereof, (d) about 0.1 to about 5 mole percent based on the moles of total dicarboxylic acid or ester, of one or more alkali or alkaline earth metal salts of 5-sulfoisophthalic dicarboxylic acid or an alkyl diester thereof, (e) about 90 to about 100 mole percent based on the moles of glycols, of one or more aliphatic glycols, and (f) 0 to about 10 mole percent based on the total amount of glycols of one or more of di(ethylene glycol) and tri(ethylene glycol).

Further objects, features and advantages of the present invention will become apparent form the detailed description that follows.

DETAILED DESCRIPTION OF PREFERRED EMBODIMENTS

One aspect of the present invention provides solvent soluble, biodegradable sulfonated aliphatic-aromatic copolyesters with IV equal to or greater than about 0.30 dL/g, such as above about 0.4 or above about 0.5 dL/g. The IV should preferably be sufficient to give non-brittle films, but not so high as to give undesired high solution viscosities.

The sulfonated aliphatic-aromatic copolyesters are preferably comprised of (A), (B) (C), (D), and (E):

(A) about 89.9 to about 35, preferably about 88 to about 46, more preferably about 84.5 to about 47, mole percent (based on the total moles of dicarboxylic acid) of an aromatic dicarboxylic acid component comprised of (i) and (ii):

(i) about 20 to about 60, preferably about 25 to about 50, more preferably about 30 to about 40, mole percent, (based on the total moles of aromatic dicarboxylic acid), of isophthalic dicarboxylic acid or a lower alkyl ($C_1$–$C_6$) diester derived therefrom, such as dimethylisophthalate, diethylisophthalate, and the like and (ii) about 80 to about 40, preferably about 78 to about 50, more preferably about 75 to about 60 mole percent, (based on the total moles of aromatic dicarboxylic acid), of an aromatic dicarboxylic acid selected from terephthalic acid and 2,6-naphthalene dicarboxylic acid, and lower dialkyl ($C_1$–$C_6$) esters derived therefrom, such as dimethylterephthalate, diethylterephthalate, dimethyl-2,6-naphthalene dicarboxylate, diethyl-2,6-naphthalene dicarboxylate, and the like;

(B) about 10 to about 60, preferably about 12 to about 50, more preferably about 15 to about 50 mole percent (based on the total moles of dicarboxylic acid) of a linear aliphatic dicarboxylic acid component comprised of one or more aliphatic dicarboxylic acids, which generally has from 2 to 36 carbon atoms, such as oxalic acid, succinic acid, glutaric acid, adipic acid, azelaic acid, dimer acid, or mixtures therefrom, and lower dialkyl diesters derived therefrom, such as dimethyl oxalate, dimethyl succinate, diethyl succinate, dimethyl glutarate, diethyl glutaratate, dimethyl azealate, and the like;

(C) about 0.1 to about 5, preferably about 0.1 to about 4, more preferably about 0.5 to about 3 mole percent (based on the total amount of dicarboxylic acid) of a sulfonate component comprised of one or more alkali or alkaline earth metal salts of 5-sulfoisophthalic acid and lower ($C_1$–$C_6$) alkyl diesters derived therefrom, such as alkali or alkaline metal salts of dimethyl-5-sulfoisophthalate, alkali or alkaline earth salts of diethyl-5-sulfoisophthalate, and the like;

(D) 100 to about 90, preferably 100 to about 92, more preferably 100 to about 95 mole percent (based on total glycol) of an aliphatic glycol component comprised of a linear aliphatic glycol, preferably having from 2 to 6 carbon atoms, such as ethylene glycol, 1,3-propanediol, 1,4-butanediol, 1,6-hexanediol, and mixtures thereof; and (E) 0 to about 10, preferably 0 to about 7.5, more preferably 0 to about 5 mole percent (based on total glycol) of a glycol component selected from di(ethylene glycol) and tri(ethylene glycol).

The polymer contains one or more alkali or alkaline earth metal salts of 5-sulfoisophthalic acid or an alkyl diester thereof. The amount of sulfo groups in the polymer should be about 0.1 to 5 mole percent. The alkali metal ion is, for example, sodium, potassium, or lithium. Alkaline earth metals such as magnesium are also useful. It has been found that as little as 0.1 mole percent of the sulfo group contributes significantly to the degradability characteristics of the resultant films or coatings.

The polyesters of the present invention are generally not soluble in water. This allows the materials of the present invention to advantageously have greater dimensional stability in the presence of moisture. This is contrasted to the sulfo-containing copolyesters of the art which incorporate higher levels (e.g., greater than 5 mole percent) of sulfo groups.

To give the desired physical properties, the sulfonated aliphatic-aromatic copolyesters of the present invention should have IV equal to or greater than 0.30. Sulfonated aliphatic-aromatic copolyesters which have IV less than 0.30 will tend to be brittle.

Minor amounts (e.g. 0 to about 2 mole percent) of polyfunctional branching agents, such as trimellitic acid or penterythritol residues, may be incorporated to modify the polymer melt or solution rheology, film processing, or the like, if desired.

The polyesters of the present invention may be prepared by any desired polycondensation techniques. For example, the various monomeric components can be charged to a polymerization vessel along with polymerization catalysts, for example, manganese and antimony catalyst, and subjected to polycondensation conditions to produce a linear polyester in which the units are randomly distributed along the molecular chain. It will be understood that it is useful, however, to first react two or more of the monomeric components to a prepolymer stage, followed by addition of the remaining components, which may be polymeric, and completion of the polymerization.

The sulfonated, aliphatic-aromatic copolyesters have been surprisingly found to be both biodegradable and solvent soluble in common, non-halogenated, polar solvents. Such solubility advantageously allows for the solvent casting of coating and films from the instant copolyester. Examples of the non-halogenated, polar solvents include tetrahydrofuran, dimethyl acetamide, dimethyl formamide, N-methylpyrollidone, dimethylsulfoxide, and the like. Tetrahydrofuran is a preferred solvent for solvent casting. The copolyesters have been found to be readily soluble in said solvents and the resulting polymer solutions have been found to provide clear films.

The copolyesters of the present invention can be used with additives known within the art. Such additives include thermal stabilizers, for example, phenolic antioxidants, secondary thermal stabilizers, for example, thioethers and phosphites, UV absorbers, for example benzophenone- and benzotriazole-derivatives, UV stabilizers, for example, hindered amine light stabilizers, (HALS), and the like. The additives may further include plasticizers, processing aides, lubricants, and the like. In addition, the compositions of the present invention may be filled with, for example, wood flour, gypsum, wollastonite, chalk, kaolin, cellulose, starch, calcium carbonate, and the like. The compositions of the present invention may also find use as a component of a polymer blend with other polymers, such as cellulose ethers, thermoplastic starch and the like.

As a further aspect of the present invention, the copolyesters have been found to be useful within a wide variety of shaped biodegradable articles. The copolyesters may be solution or melt processed to form coatings, films, and the like. Coatings may be produced, e.g., by coating a substrate with polymer solutions of the copolyesters followed by drying, by coextruding the copolyesters with other materials, or by melt coating a preformed substrate with the polyesters. The copolyesters will find utility in any process incorporating polyester known within the art. Coatings derived from the copolyesters will find utility as barriers to moisture, oxygen, carbon dioxide and the like. The coatings derived from the copolyesters will also be useful as adhesives. Films of the copolyesters may be produced by any known art method, including, for example, solution or melt casting.

The following examples illustrate, but do no limit the invention.

EXAMPLES AND COMPARATIVE EXAMPLES

Test Methods.

Differential Scanning Calorimetry, (DSC), was performed on a TA Instruments Model Number 2920 machine. Samples were heated under a nitrogen atmosphere at a rate of 20° C./minute to 300° C., programmed cooled back to room temperature at a rate of 20° C./minute and then reheated to 300° C. at a rate of 20° C./minute. The observed sample glass transition temperature, (Tg), and crystalline melting temperature, (Tm), noted below were from the second heat.

Inherent Viscosity, (IV), is defined in "Preparative Methods of Polymer Chemistry", W. R. Sorenson and T. W. Campbell, 1961, p. 35. It is determined at a concentration of 0.5 g./100 mL of a 50:50 weight percent trifluoroacetic acid:dichloromethane acid solvent system at room temperature by a Goodyear R-103B method.

Laboratory Relative viscosity, (LRV), is the ratio of the viscosity of a solution of 0.6 gram of the polyester sample dissolved in 10 mL of hexafluoroisopropanol, (HFIP), containing 80 ppm sulfuric acid to the viscosity of the sulfuric acid-containing hexafluoroisopropanol itself, both measured at 25° C. in a capillary viscometer. The LRV may be numerically related to IV. Where this relationship is utilized, the term "calculated IV" is noted.

Biodegradation was performed according to the ISO 14855 method: "Determination of the ultimate aerobic biodegradability and disintegration of plastic materials under controlled composting conditions—Method by analysis of evolved carbon". This test involved injecting an inoculum consisting of a stabilized and mature compost derived from the organic fraction of municipal solid waste with ground powder of the polymer to be tested, composting under standard conditions at an incubation temperature controlled at 58° C.+/−20° C. The test was conducted with one polymer sample. The carbon dioxide evolved was used to determine the extent of biodegradation.

Comparative Example CE 1

To a 1 liter glass flask was added dimethyl terephthalate, (419.45 grams), ethylene glycol, (317.64 grams), dimethyl isophthalate-3-sodium sulfonate, (16.29 grams), dimethyl glutarate, (77.78 grams), di(ethylene glycol), (14.25 grams), manganese(II) acetate tetrahydrate, (0.68 grams), and antimony(III) trioxide, (0.20 grams). The reaction mixture was stirred and heated to 180° C. under a slow nitrogen purge. After achieving 180° C., the reaction mixture was heated to 285° C. over 2 hours with stirring under a slow nitrogen purge. 250.29 grams of a colorless distillate was collected over this heating cycle. The reaction mixture was then staged to full vacuum with stirring at 285° C. The resulting reaction mixture was stirred for 4.5 hours under full vacuum, (pressure under 100 mtorr). The vacuum was then released with nitrogen and the reaction mass allowed to cool to room temperature. An additional 75.6 grams of distillate was recovered and 443 grams of an opaque solid product was isolated.

IV=0.94 dL/g

DSC (N2, 20° C./min) Tg 55.4° C., Tm 177.7° C. (17 J/g)

1.0 gram of this resin was placed in 9.0 grams of tetrahydrofuran, (THF), and mixed at room temperature, (22° C.+/−5° C.). This resin was not found to be soluble under these conditions. The example is a comparative example because it does not contain any isophthalic acid or ester.

Comparative Example CE 2

To a 1 liter glass flask was added dimethyl terephthalate, (377.51 grams), ethylene glycol, (317.64 grams), dimethyl isophthalate-3-sodium sulfonate, (16.29 grams), dimethyl glutarate, (77.78 grams), di(ethylene glycol), (14.25 grams), dimethyl isophthalate, (41.95 grams), manganese(II) acetate tetrahydrate, (0.68 grams), and antimony(III) trioxide, (0.20 grams). The reaction mixture was stirred and heated to 180° C. under a slow nitrogen purge. After achieving 180° C., the reaction mixture was heated to 285° C. over 1 hour with stirring under a slow nitrogen purge. 246.77 grams of a colorless distillate was collected over this heating cycle. The reaction mixture was then staged to full vacuum with stirring at 285° C. The resulting reaction mixture was stirred for 5.5 hours under full vacuum, (pressure under 100 mtorr). The vacuum was released with nitrogen and the reaction mass was allowed to cool to room temperature. An additional 89.2 grams of distillate was recovered and 421.9 grams of an opaque solid product was isolated.

IV=0.77 dL/g

DSC, (N2, 20° C./min) Tg=51° C., no Tm observed.

1.0 gram of this resin was placed in 9.0 grams of tetrahydrofuran, (THF), and mixed at room temperature, (22° C.+/−5° C.). This resin was not found to be soluble under these conditions. This example is a comparative example, because it contains only about 10 mole % of isophthalic acid or ester thereof.

Example 1

To a 1 liter glass flask was added dimethyl terephthalate, (314.59 grams), ethylene glycol, (317.64 grams), dimethyl isophthalate-3-sodium sulfonate, (16.20 grams), dimethyl glutarate, (77.78 grams), di(ethylene glycol), (14.25 grams), dimethyl isophthalate, (104.86 grams), manganese(II) acetate tetrahydrate, (0.68 grams), and antimony(III) trioxide, (0.20 grams). The reaction mixture was stirred and heated to 180° C. under a slow nitrogen purge. After achieving 180° C., the reaction mixture was heated to 285° C. over 1 hour with stirring under a slow nitrogen purge. 252.4 grams of a colorless distillate was collected over this heating cycle. The reaction mixture was then staged to full vacuum with stirring at 285° C. The resulting reaction mixture was stirred for 5.5 hours under full vacuum, (pressure under 100 mtorr). The vacuum was then released with nitrogen and the reaction mass allowed to cool to room temperature. An additional 87.4 grams of distillate was recovered and 461.0 grams of a solid product was recovered.

IV=0.71 dL/g

DSC (N2, 20° C./min) Tg 49.4° C., no Tm observed 1.0 gram of this resin was placed in 9.0 grams of tetrahydrofuran, (THF), and mixed at room temperature, (22° C.+/−5° C.). This resin was found to be fully soluble to form a clear solution under these conditions.

Comparative Example CE3

To a 250 milliliter glass flask was added dimethyl terephthalate, (82.53 grams), ethylene glycol, (70.92 grams), dimethyl isophthalate-3-sodium sulfonate, (3.77 grams), dimethyl glutarate, (32.03 grams), dimethyl isophthalate, 14.56 grams), manganese(II) acetate tetrahydrate, (0.045 grams), and antimony(III) trioxide, (0.0675 grams). The reaction mixture was stirred and heated to 180° C. under a slow nitrogen purge. After achieving 180° C., the reaction mixture was heated to 285° C. over 4 hours with stirring under a slow nitrogen purge. 48.89 grams of a colorless distillate was collected over this heating cycle. The reaction mixture was then staged to full vacuum with stirring at 285° C. The resulting reaction mixture was stirred for 4 hours under full vacuum, (pressure under 100 mtorr). The vacuum was then released with nitrogen and the reaction mass allowed to cool to room temperature. An additional 11.60 grams of distillate was recovered and 114.4 grams of a solid product was recovered.

LRV=30.44 (calculated IV=0.80 dL/g)

DSC (N2, 20° C./min) no Tg or Tm observed 1.12 grams of this resin was placed in 10.0 grams of tetrahydrofuran, (THF), and mixed at room temperature, (22° C.+/−5° C.). This resin was not found to be soluble under these conditions. This example is a comparative example because it only contains about 15 mole % isophthalic or ester thereof.

Example 2

To a 250 milliliter glass flask was added dimethyl terephthalate, (72.82 grams), ethylene glycol, (70.92 grams), dimethyl isophthalate-3-sodium sulfonate, (3.77 grams), dimethyl glutarate, (32.03 grams), dimethyl isophthalate, (24.27 grams), manganese(II) acetate tetrahydrate, (0.045 grams), and antimony(III) trioxide, (0.0675 grams). The reaction mixture was stirred and heated to 180° C. under a slow nitrogen purge. After achieving 180° C., the reaction mixture was heated to 285° C. over 4 hours with stirring under a slow nitrogen purge. 28.88 grams of a colorless distillate was collected over this heating cycle. The reaction mixture was then staged to full vacuum with stirring at 285° C. The resulting reaction mixture was stirred for 4 hours under full vacuum, (pressure under 100 mtorr). The vacuum was then released with nitrogen and the reaction mass allowed to cool to room temperature. An additional 13.33 grams of distillate was recovered and 109.3 grams of a solid product was recovered.

LRV=19.95 (calculate IV=0.61 dL/g)

DSC (N2, 20° C./min) no Tg or Tm observed 1.12 grams of this resin was placed in 10.0 grams of tetrahydrofuran, (THF), and mixed at room temperature, (22° C.+/−5° C.). This resin was found to be fully soluble to form a clear solution under these conditions.

The above prepared polymer solution in tetrahydrofuran was poured into a 2-inch diameter aluminum pan and the solvent was allowed to evaporate at room temperature overnight. The resulting film was clear and was found to have excellent adhesion to the aluminum metal. The film was stripped from the aluminum pan and was found to be clear and very pliable.

Example 3

To a 1 liter glass flask was added dimethyl terephthalate, (283.52 grams), ethylene glycol, (317.64 grams), dimethyl isophthalate-3-sodium sulfonate, (16.29 grams), dimethyl glutarate, (77.78 grams), di(ethylene glycol), (14.25 grams), dimethyl isophthalate, (136.32 grams), manganese(II) acetate tetrahydrate, (0.20 grams), and antimony(III) trioxide, (0.279 grams). The reaction mixture was stirred and heated to 180° C. under a slow nitrogen purge. After achieving 180° C., the reaction mixture was heated to 285° C. over 3.25 hours with stirring under a slow nitrogen purge. 250.0 grams of a colorless distillate was collected over this heating cycle. The reaction mixture was then staged to full vacuum with stirring at 285° C. The resulting reaction mixture was stirred for 5.5 hours under full vacuum, (pressure under 100 mtorr). The vacuum was then released with nitrogen and the reaction mass allowed to cool to room temperature. An additional 87.0 grams of distillate was recovered and the solid product was recovered.

LRV=14.26

DSC (N2, 20° C./min) Tg 39.2° C., no Tm observed 1.11 grams of this resin was placed in 10.0 grams of tetrahydrofuran, (THF), and mixed at room temperature, (22° C.+/−5° C.). This resin was found to be fully soluble to form a clear solution under these conditions.

Example 4

To a 1 liter glass flask was added dimethyl terephthalate, (251.67 grams), ethylene glycol, (317.64 grams), dimethyl isophthalate-3-sodium sulfonate, (16.29 grams), dimethyl glutarate, (77.78 grams), di(ethylene glycol), (14.25 grams), dimethyl isophthalate, (167.78 grams), manganese(II) acetate tetrahydrate, (0.20 grams), and antimony(III) trioxide, (0.279 grams). The reaction mixture was stirred and heated to 180° C. under a slow nitrogen purge. After achieving 180° C., the reaction mixture was heated to 285° C. over 3.5 hours with stirring under a slow nitrogen purge. The resulting reaction mixture was then allowed to stir at 285° C. for 1.5 hours under a slow nitrogen purge. 293.0 grams of a colorless distillate was collected over this heating cycle. The reaction mixture was then staged to full vacuum with stirring at 285° C. The resulting reaction mixture was stirred for 4.5 hours under full vacuum, (pressure under 100 mtorr). The vacuum was then released with nitrogen and the reaction mass allowed to cool to room temperature. The resulting solid product was recovered.

LRV=17.51

DSC (N2, 20° C./min) Tg 30.8° C., no Tm observed 1.11 grams of this resin was placed in 10.0 grams of tetrahydrofuran, (THF), and mixed at room temperature, (22° C.+/−5° C.). This resin was found to be fully soluble to form a clear solution under these conditions.

Example 5

To a 1 liter glass flask was added dimethyl terephthalate, (209.73 grams), ethylene glycol, (317.64 grams), dimethyl isophthalate-3-sodium sulfonate, (16.29 grams), dimethyl glutarate, (77.78 grams), di(ethylene glycol), (14.25 grams), dimethyl isophthalate, (209.73), manganese(II) acetate tetrahydrate, (0.20 grams), and antimony(III) trioxide, (0.279 grams). The reaction mixture was stirred and heated to 180° C. under a slow nitrogen purge. After achieving 180° C., the reaction mixture was heated to 285° C. over 2.5 hours with stirring under a slow nitrogen purge. The resulting reaction mixture was allowed to stir at 285° C. for 0.5 hours under a slow nitrogen purge. 286.0 grams of a colorless distillate was collected over this heating cycle. The reaction mixture was then staged to full vacuum with stirring at 285° C. The resulting reaction mixture was stirred for 5 hours under full vacuum, (pressure under 100 mtorr). The vacuum was then released with nitrogen and the reaction mass allowed to cool to room temperature. The solid product was recovered.

LRV=9.84

DSC (N2, 20° C./min) no Tg or Tm observed 1.11 grams of this resin was placed in 10.0 grams of tetrahydrofuran, (THF), and mixed at room temperature, (22° C.+/−5° C.). This resin was found to be fully soluble to form a clear solution under these conditions.

Example 6

To an autoclave was charged dimethyl terephthalate, (77.25 pounds), ethylene glycol, (78.0 pounds), dimethyl isophthalate, (25.75 pounds), dimethyl isophthalate-3-sodium sulfonate, (1815 grams), dimethyl glutarate, (19.1 pounds), manganese(II) acetate tetrahydrate, (37.65 grams), and antimony(III) trioxide, (13.6 grams). The autoclave was purged three times with nitrogen and heated to 245° C. over 4.5 hours with stirring. Over this heating cycle, 21,800 grams of distillate was recovered. With continued heating and stirring, vacuum was staged onto the autoclave over 1.5 hours. The resulting reaction mixture was stirred at 275° C. under full vacuum, (pressure equal to or less than 2 mm Hg), for 4 hours. The vacuum was then released and the resulting reaction mixture extruded out of the autoclave as a ribbon, the polymer ribbon was cooled and chopped.

IV=0.68 dL/g

The above prepared polymer was ground to powder and subjected to a biodegradation test as detailed above with the results reported below.

TABLE 1

Biodegradation Test Results For Example 6.

| Test Duration (Days) | Percentage Biodegradation |
|---|---|
| 21 | 14.2 |
| 50 | 22.7 |
| 71 | 26.4 |
| 95 | 30.3 |

Example 7

To a 250 milliliter glass flask was added dimethyl terephthalate, (72.82 grams), ethylene glycol, (70.92 grams), dimethyl isophthalate-3-sodium sulfonate, (3.77 grams), dimethyl adipate, (26.13 grams), dimethyl isophthalate, (24.27 grams), manganese(II) acetate tetrahydrate, (0.045 grams), and antimony(III) trioxide, (0.0675 grams). The reaction mixture was stirred and heated to 180° C. under a slow nitrogen purge. After achieving 180° C., the reaction mixture was heated to 285° C. over 5 hours with stirring under a slow nitrogen purge. 25.37 grams of a colorless distillate was collected over this heating cycle. The reaction mixture was then staged to full vacuum with stirring at 285° C. The resulting reaction mixture was stirred for 4 hours under full vacuum, (pressure under 100 mtorr). The vacuum was then released with nitrogen and the reaction mass allowed to cool to room temperature. An additional 8.68 grams of distillate was recovered and 108.65 grams of a solid product was recovered.

LRV=18.72 (calculate IV=0.58 dL/g)

DSC (N2, 20° C./min) no Tg or Tm observed 1.12 grams of this resin was placed in 10.0 grams of tetrahydrofuran, (THF), and mixed at room temperature, (22° C.+/−5° C.). This resin was found to be mostly soluble and formed a clear solution with a small amount of heavily swollen polymer particles under these conditions.

Example 8

To a 250 milliliter glass flask was added dimethyl terephthalate, (72.82 grams), ethylene glycol, (70.92 grams), dimethyl isophthalate-3-sodium sulfonate, (3.77 grams), dimethyl adipate, (34.84 grams), dimethyl isophthalate, (24.27 grams), manganese(II) acetate tetrahydrate, (0.045 grams), and antimony(III) trioxide, (0.0675 grams). The reaction mixture was stirred and heated to 180° C. under a slow nitrogen purge. After achieving 180° C., the reaction mixture was heated to 285° C. over 4.5 hours with stirring under a slow nitrogen purge. 47.64 grams of a colorless distillate was collected over this heating cycle. The reaction mixture was then staged to full vacuum with stirring at 285° C. The resulting reaction mixture was stirred for 6 hours under full vacuum, (pressure under 100 mtorr). The vacuum was then released with nitrogen and the reaction mass allowed to cool to room temperature. An additional 13.02 grams of distillate was recovered and 101.21 grams of a solid product was recovered.

LRV=22.86 (calculate IV=0.66)

DSC (N2, 20° C./min) no Tg or Tm observed 1.12 grams of this resin was placed in 10.0 grams of tetrahydrofuran, (THF), and mixed at room temperature, (22° C.+/−5° C.). This resin was found to be fully soluble to form a clear solution under these conditions.

The above prepared polymer solution in tetrahydrofuran was poured into a 2-inch diameter aluminum pan and the solvent was allowed to evaporate at room temperature overnight. The resulting film was clear and was found to have excellent adhesion to the aluminum metal. When stripped from the aluminum pan, the film was found to be soft and pliable and to have elastic characteristics.

As suggested in the examples in the disclosure, the copolyesters of the present invention have been found to be soluble while the comparatives are not soluble. Because of that, the copolyesters of the present invention are formable into useful articles by solvent processes, (solvent casting/solvent coating), and the comparatives are not.

While the invention has been described in the preceding Examples, there is no intent to limit the scope of the invention to the scope of those Example as one skilled in the art will understand that the invention is applicable to other combinations and materials not taught herein by specific example.

What is claimed is:

1. An amorphous copolyester having an inherent viscosity of equal to or greater than about 0.3 dL/g comprising:
   (a) about 20 to about 60 mole percent based on the total moles of aromatic dicarboxylic acid or ester, of one or more of isophthalic dicarboxylic acid or an alkyl diester thereof,
   (b) about 40 to about 80 mole percent based on the total moles of aromatic dicarboxylic acid or ester, of one or more of terephthalic acid, an alkyl diester thereof, 2,6-naphthalene dicarboxylic acid, or an alkyl diester thereof,
   (c) about 15 to about 60 mole percent based on the total moles of dicarboxylic acid or ester, of one or more linear aliphatic dicarboxylic acids or an alkyl diester thereof,
   (d) about 0.1 to about 5 mole percent based on the moles of total dicarboxylic acid or ester, of one or more alkali or alkaline earth metal salts of 5-sulfoisophthalic dicarboxylic acid or an alkyl diester thereof,
   (e) about 90 to 100 mole percent based on the total amount of glycols, of one or more linear aliphatic glycols, and
   (f) 0 to about 10 mole percent based on the total amount of glycols of one or more of di(ethylene glycol) and tri(ethylene glycol);
   said copolyester being insoluble in water and soluble in polar organic solvents.

2. A copolyester as claimed in claim 1, which comprises about 35 to about 89.9 mole percent of total aromatic dicarboxylic acids or esters based on the total moles of dicarboxylic acids or ester.

3. A copolyester as claimed in claim 1, which is not formed from neopentyl glycol.

4. A copolyester as claimed in claim 1, wherein (e) is selected form the group consisting of ethylene glycol, 1,3-propane diol, 1,4-butanediol, 1.6-hexanediol, and a mixture of two or more thereof.

5. A copolyester as claimed in claim 1, which is soluble in one or more of tetrahydrofuron, dimethyl acetamide, N-methyl pyrollidone, or dimethyl sulfoxide.

6. A copolyester as claimed in claim 1, further formed from a polyfunctional branching agent.

7. A shaped article formed from a copolyester as claimed in claim 1.

8. A coating, film, or adhesive formed from a copolyester as claimed in claim 1.

9. A copolyester as claimed in claim 1, which consists essentially of said (a), (b), (C), (d), and (e).

10. A method of improving the biodegradability and polar solvent solubility of a polyester, comprising forming the polyester from
   (a) about 20 to about 60 mole percent based on the total moles of aromatic dicarboxylic acid or ester, of one or more of isophthalic dicarboxylic acid or an alkyl diester thereof,
   (b) about 40 to about 80 mole percent based on the total moles of aromatic dicarboxylic acid or ester, of one or more of terephthalic acid, an alkyl diester thereof, 2,6-naphthalene dicarboxylic acid, or an alkyl diester thereof,
   (c) about 15 to about 60 mole percent based on the total moles of dicarboxylic acid or ester, of one or more linear aliphatic dicarboxylic acids or an alkyl diester thereof,
   (d) about 0.1 to about 5 mole percent based on the moles of total dicarboxylic acid or ester, of one or more alkali or alkaline earth metal salts of 5-sulfoisophthalic dicarboxylic acid or an alkyl diester thereof,
   (e) about 90 to 100 mole percent based on the total amount of glycols, of one or more linear aliphatic glycols, and
   (f) 0 to about 10 mole percent based on the total amount of glycols of one or more of di(ethylene glycol) and tri(ethylene glycol);
   such that said polyester is amorphous, insoluble in water and soluble in polar organic solvents.

11. A method of forming a film or coating that comprises solvent casting or solvent coating a an amorphous polyester comprising:
   (a) about 20 to about 60 mole percent based on the total moles of aromatic dicarboxylic acid or ester, of one or more of isophthalic dicarboxylic acid or an alkyl diester thereof,
   (b) about 40 to about 80 mole percent based on the total moles of aromatic dicarboxylic acid or ester, of one or more of terephthalic acid, an alkyl diester thereof, 2,6-naphthalene dicarboxylic acid, or an alkyl diester thereof,
   (c) about 15 to about 60 mole percent based on the total moles of dicarboxylic acid or ester, of one or more linear aliphatic dicarboxylic acids or an alkyl diester thereof,
   (d) about 0.1 to about 5 mole percent based on the moles of total dicarboxylic acid or ester, of one or more alkali or alkaline earth metal salts of 5-sulfoisophthalic dicarboxylic acid or an alkyl diester thereof,
   (e) about 90 to 100 mole percent based on the total amount of glycols, of one or more linear aliphatic glycols, and
   (f) 0 to about 10 mole percent based on the total amount of glycols of one or more of di(ethylene glycol) and tri(ethylene glycol);
   said polyester being insoluble in water and soluble in polar organic solvents.

* * * * *

UNITED STATES PATENT AND TRADEMARK OFFICE
CERTIFICATE OF CORRECTION

PATENT NO. : 6,746,779 B2
DATED : June 8, 2004
INVENTOR(S) : Hayes Richard Allen and Kosinski Leonard Edward It is certified that error appears in the above-identified patent and that said Letters Patent is hereby corrected as shown below:

Column 11,
Line 4, delete "form", add -- from --.
Lines 7-9, delete "5. A copolyester as claimed in claim 1, which is soluble in one or more of tetrahydrofuron, dimethyl acetamide, N-methyl pyrollidone, or dimethyl sulfoxide."
Line 10, delete "6.", add -- 5. --.
Line 12, delete "7.", add -- 6. --.
Line 14, delete "8.", add -- 7. --.
Line 16, delete "9.", add -- 8. --.
Line 17, delete "C", add -- c --.
Line 18, delete "10.", add -- 9. --.

Column 12,
Line 9, delete "11.", add -- 10. --.
Line 10, delete "a".

Signed and Sealed this

Fourth Day of October , 2005

JON W. DUDAS
*Director of the United States Patent and Trademark Office*